(12) United States Patent
Knott et al.

(10) Patent No.: US 7,364,118 B2
(45) Date of Patent: Apr. 29, 2008

(54) PROPULSION ARRANGEMENT

(75) Inventors: David S Knott, Quorn (GB); Christopher Freeman, Farnsfield (GB)

(73) Assignee: Rolls-Royce plc, London (GB)

( * ) Notice: Subject to any disclaimer, the term of this patent is extended or adjusted under 35 U.S.C. 154(b) by 226 days.

(21) Appl. No.: 10/847,853

(22) Filed: May 19, 2004

(65) Prior Publication Data
US 2005/0199766 A1 Sep. 15, 2005

(30) Foreign Application Priority Data
Jun. 11, 2003 (GB) .................... 0313456.6

(51) Int. Cl.
B64D 27/18 (2006.01)
B64D 33/04 (2006.01)

(52) U.S. Cl. .............. 244/73 R; 244/55; 244/204

(58) Field of Classification Search ............. 244/53 R, 244/198, 199.1, 199.2, 199.3, 199.4, 200, 244/201, 203, 204, 205, 206, 207–209, 33 R, 244/33 A, 33 B, 54–61, 62, 73 R
See application file for complete search history.

(56) References Cited

U.S. PATENT DOCUMENTS

| | | | |
|---|---|---|---|
| 2,434,085 A * | 1/1948 | Suggs ..................... 244/57 |
| 2,809,793 A * | 10/1957 | Warner .................... 244/208 |
| 3,285,538 A * | 11/1966 | Burnelli ................... 244/36 |
| 3,430,640 A * | 3/1969 | Lennard .................. 137/15.1 |
| 3,507,463 A * | 4/1970 | Kuntz ..................... 244/199.1 |
| 3,612,446 A * | 10/1971 | Lebert .................... 244/35 R |
| 3,752,422 A * | 8/1973 | Runnels et al. .......... 244/118.5 |
| 3,764,814 A * | 10/1973 | Griffith ................... 290/40 R |
| 3,915,106 A * | 10/1975 | De Witt .................. 114/275 |
| 4,174,083 A * | 11/1979 | Mohn ..................... 244/53 B |
| 4,343,506 A * | 8/1982 | Saltzman ................. 296/24.31 |
| 4,418,879 A * | 12/1983 | Vanderleest ............. 244/53 B |
| 4,917,332 A | 4/1990 | Patterson |
| 5,358,156 A * | 10/1994 | Rethorst .................. 244/15 |
| 5,516,061 A * | 5/1996 | Glasgow ................. 244/53 R |
| 5,810,284 A * | 9/1998 | Hibbs et al. ............. 244/13 |
| 5,934,612 A * | 8/1999 | Gerhardt ................. 244/58 |
| 5,948,044 A * | 9/1999 | Varley et al. ............ 701/220 |
| 6,068,328 A * | 5/2000 | Gazdzinski ............. 296/181.5 |
| 6,122,595 A * | 9/2000 | Varley et al. ............ 701/220 |
| 6,199,000 B1 * | 3/2001 | Keller et al. ............ 701/50 |
| 6,328,265 B1 * | 12/2001 | Dizdarevic ............. 244/213 |
| 6,371,414 B1 * | 4/2002 | Truax et al. ............ 244/201 |

(Continued)

FOREIGN PATENT DOCUMENTS

GB 0 720 394 SP 12/1954

(Continued)

Primary Examiner—Rob Swiatek
(74) Attorney, Agent, or Firm—W. Warren Taltavull; Manelli Denison & Selter PLLC

(57) ABSTRACT

In order to achieve greater operational efficiency a propulsive arrangement is provided in which a relatively large number of small propulsive assemblies 9; 31, 32, 33 are provided in aircraft structures in particular the wing 7; 30. The assemblies 9; 31, 32, 33 comprise a flow path within which a compressor 39, 43, 47 is positioned to propel an air flow for propulsion. The compressors 39, 43, 47 are powered by electricity from an electricity generator 8 and possibly supplemented by solar cells or fuel cells or wing tip turbine generators 11. The assemblies 9, 31, 32, 33 are small to allow easy removal for maintenance and repair.

27 Claims, 3 Drawing Sheets

U.S. PATENT DOCUMENTS

| | | | |
|---|---|---|---|
| 6,425,552 B1* | 7/2002 | Lee et al. | 244/97 |
| 6,527,224 B2* | 3/2003 | Seidel | 244/53 B |
| 6,553,299 B1* | 4/2003 | Keller et al. | 701/50 |
| 6,796,533 B2* | 9/2004 | Barrett et al. | 244/208 |
| 6,824,097 B1* | 11/2004 | Ouellette et al. | 244/23 B |
| 6,926,231 B2* | 8/2005 | Ouellette et al. | 244/23 B |
| 2003/0187560 A1* | 10/2003 | Keller et al. | 701/50 |
| 2003/0230671 A1* | 12/2003 | Dunn | 244/53 R |
| 2004/0094662 A1* | 5/2004 | Sanders et al. | 244/12.5 |
| 2006/0102801 A1* | 5/2006 | Manley | 244/208 |

FOREIGN PATENT DOCUMENTS

| | | |
|---|---|---|
| GB | 0 847 868 SP | 9/1960 |
| GB | 1 066 360 SP | 4/1967 |
| GB | 2 288 779 A | 11/1995 |
| GB | 2 344 092 A | 5/2000 |

* cited by examiner

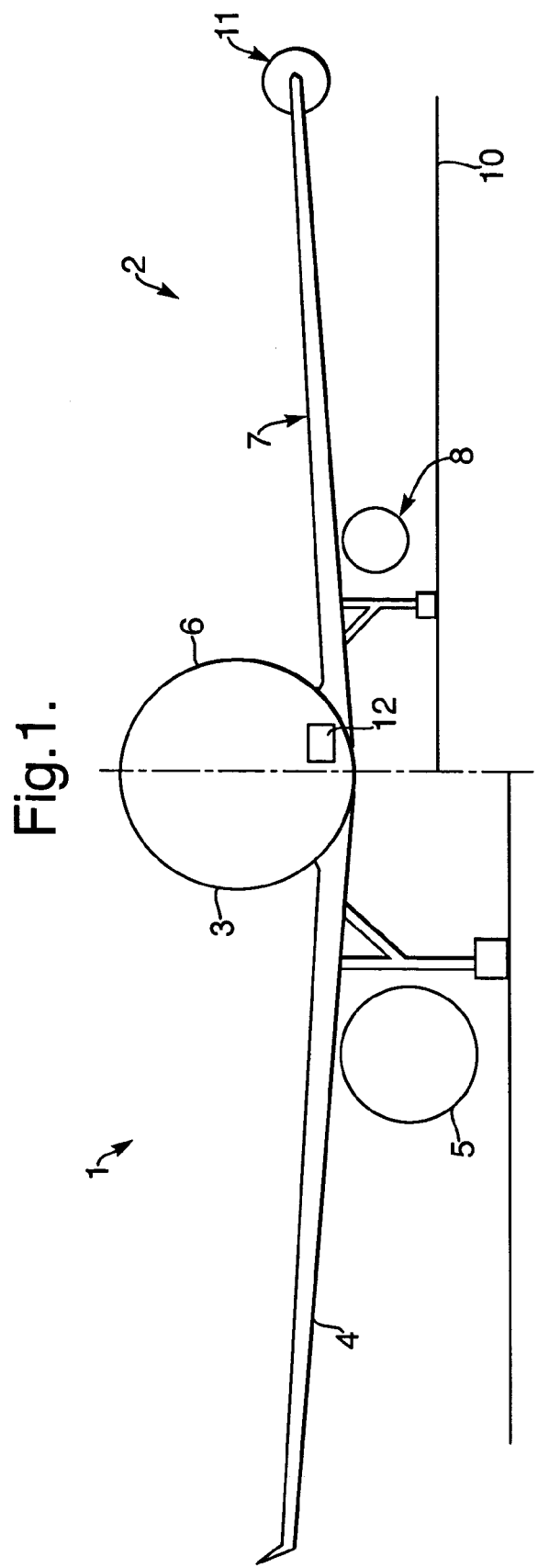

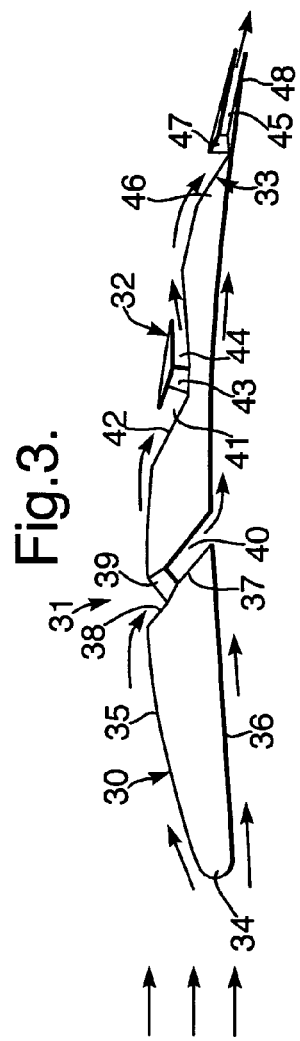
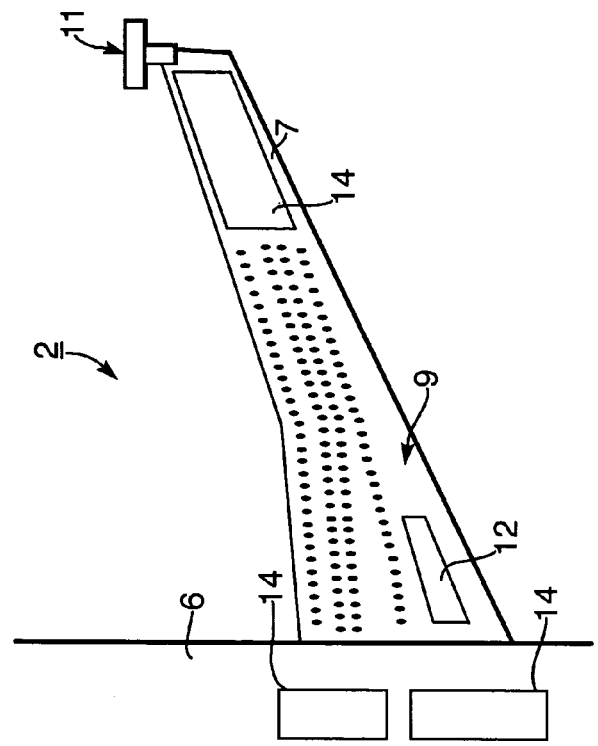
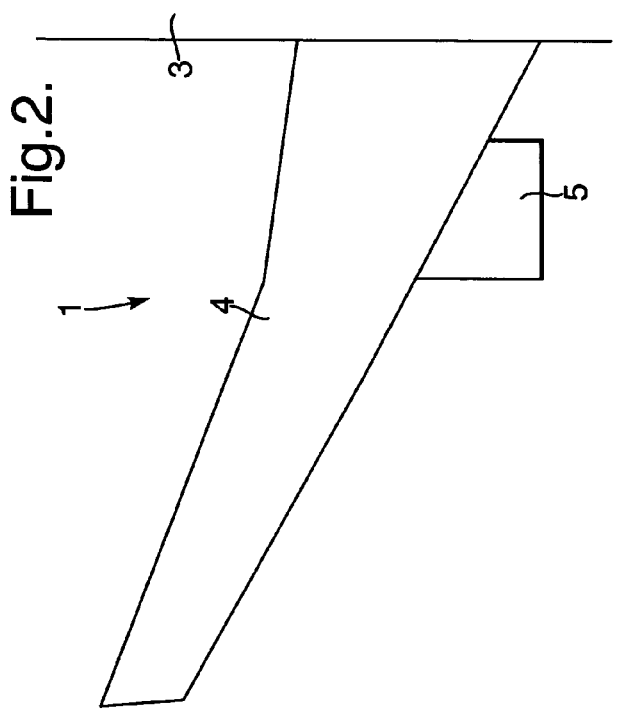

PROPULSION ARRANGEMENT

FIELD OF THE INVENTION

The present invention relates to propulsion arrangements for aircraft and more particularly to such arrangements with improved propulsion efficiency in terms of energy usage and/or noise.

BACKGROUND OF THE INVENTION

Traditionally, aircraft have been given forward motion by engines in pods located either below or in wing structures or tail rudders. These engine pods have generally incorporated a turbine engine which draws air from its inlet through the engine to provide an outlet flow accelerated by combustion to provide propulsion. It will be appreciated that such propulsion is relatively noisy and the engine pods take the form of cowlings which add to drag. The engine itself will also add significantly to weight and with only a limited number of engines failure of one engine greatly reduce the propulsive power available.

Ideally, the means of propulsion should have as limited an effect on drag and as low a weight contribution as possible whilst being configured to utilize fuel as efficiently as possible. Furthermore, the engines used for propulsion should be easily maintained.

Previously, it has been suggested to provide large numbers of lift fans associated with a turbine engine (see GB847,868) for vertical take-off. However, these fans generally direct air flows from a source engine rather than their own propulsive contribution. Furthermore, there is no consideration of energy recovery and efficiency.

SUMMARY OF THE INVENTION

In accordance with the present invention there is provided an aircraft propulsion arrangement comprising a plurality of propulsive assemblies substantially located within and about the structure of an aircraft, the propulsive assemblies being electrically driven and configured to generate in use air flows which draw from above an aircraft wing its boundary layer with principally lateral air flow for propulsion of the aircraft.

Typically, the propulsive assemblies comprise a flow path and compressor driven by an electric motor. Generally, the flow path is a tunnel or passage. Normally, the propulsive assemblies are located in an aircraft wing. Typically, the propulsive assemblies are located through a wing cross-section or sunken within a wing surface or form the tail of that wing.

Possibly, the compressor is a single stage compressor, a multi-stage compressor, a contra-rotating axial flow compressor or centrifugal flow compressor to provide propulsive air flow.

Generally, each flow path will comprise a passage to provide an inlet and an outlet with the compressor between them. Typically, the inlet has a width in the order of 150 mm. Generally, the propulsive arrangement comprises in the order of two hundred propulsive assemblies appropriately distributed about an aircraft to provide adequate propulsion for that aircraft. Advantageously, each propulsive assembly or a group of propulsive assemblies is selectively operable to vary their propulsive airflow rate or to allow each propulsive assembly or a group of propulsive assemblies to be switched off or on as required. Normally, the propulsive assemblies are operationally reversible to provide reverse thrust.

Typically, the propulsive arrangement has an electricity supply provided by a gas turbine engine with an electricity generator along with possibly fuel cells and/or solar cells and/or wind turbines. The wind turbines may be secured at appropriate vortex positions such as wing tips. The gas turbine engine may have a power turbine to drive the electricity generator.

Typically, each propulsive assembly includes a flap in order to close off the propulsive assembly when not in use for aerodynamic profile drag characteristic improvement.

Normally, each propulsive assembly or at least the compressor is an integral unit readily installed and removed from the structure for maintenance and/or repair. Typically, at least the compressor in each propulsive assembly is interchangeable with the compressor in other propulsive assemblies within the arrangement.

Possibly, the air flows are drawn from the boundary layer and/or above that boundary layer of the aircraft wing.

Also in accordance with the present invention there is provided an aircraft including a propulsion arrangement as described above.

BRIEF DESCRIPTION OF THE DRAWINGS

An embodiment of the present invention wilt now be described by way of example only with reference to the accompanying drawings in which:

FIG. 1 is a schematic front view of an aircraft showing in one half a previous propulsive arrangement and in another half a propulsive arrangement in accordance with the present invention;

FIG. 2 is a schematic plan view of the aircraft depicted in FIG. 1.

FIG. 3 is a schematic side cross-section of a wing with propulsive assemblies in accordance with the present invention.

DETAILED DESCRIPTION OF THE INVENTION

Figure 4:
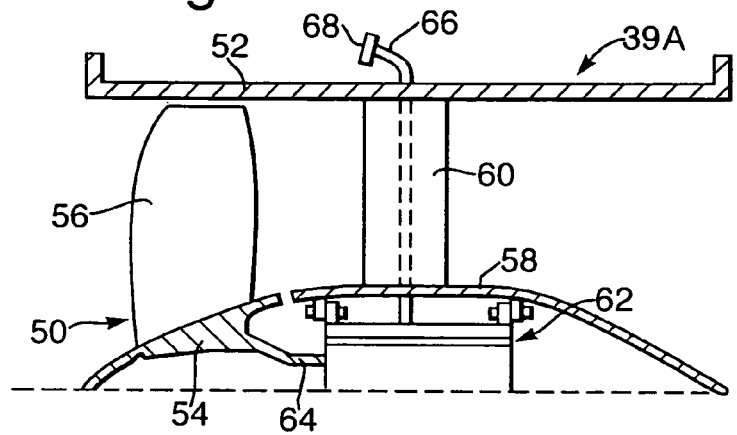
FIG. 4 is a part longitudinal cross-sectional view through a compressor of a propulsive assembly according to the present invention.

Referring to FIG. 1 and FIG. 2 providing schematic illustrations of an aircraft including in one half 1 a previous propulsive arrangement and in the other half 2 a propulsive arrangement in accordance with the present invention. In the conventional half 1 an aircraft structure 3 includes a wing 4 upon which an engine pod or cowling 5 is secured. As indicated previously, the cowling 5 encloses a gas turbine engine for propulsion of the aircraft. The engine is not ideally suited or positioned for propulsion and adds drag and weight.

The present invention shown in part 2 generally comprises an aircraft structure 6 with a wing 7. A gas turbine engine 8 is provided with an electrical generator to provide electrical power to propulsive assemblies 9 formed within or about the wing 7. Each assembly 9 has an inlet and an outlet to define an airflow pathway with a compressor driven by an electric motor to act as a compressor for propulsive flow. The assemblies 9 act in concert to provide propulsion for the aircraft.

The propulsive airflow generated by the assemblies 9 acts to draw off the boundary layer of the wing 7. The assemblies 9 are small enough to achieve this boundary layer lift and generally light enough to be installed and removed by hand. Normally, in the order of two hundred assemblies 9 will be provided for each aircraft, one hundred per wing in a balanced at least operational relationship. However, the actual number of assemblies will depend upon operational requirements.

As indicated above the assemblies 9 depend upon an electric motor to provide drive to a compressor in the pathway between the inlet and the outlet. This electric motor is powered by electricity from the gas turbine engine 8 normally located below the wing 7 but which could be located elsewhere on the aircraft. Generally, a higher efficiency wing 7 can be used due to the greater proportional effectiveness of the propulsive assemblies 9. Furthermore, the gas turbine engine 8 only provides limited, if any, thrust. Thus, the pylon attachments required to the wing 7 are less substantial in order to transfer that thrust. Additionally, the gas turbine engine 8 may have less weight than a previous engine/cowling 5 arrangement. The aircraft can be lower to the ground 10 so that shorter landing gear is required as less ground clearance is required for the engine/cowling 5. Thus, overall use of the gas turbine engine 8 represents less weight than the previous engine/cowling 5 with significant benefits with regard to previous aviation propulsion arrangements.

The engine 8 may be supplemented particularly when an aircraft is cruising by a wing tip turbine 11. This turbine 11 acts to generate electricity from the wing tip vortex created as the aircraft flies. The turbine 11 rotates in the vortex to generate electricity. Clearly, the turbine 11 is a drag upon the aerodynamics of the wing 7 but in providing electricity from the wing tip vortices there is a degree of energy recovery which significantly improves operational efficiency for the present arrangement.

In addition to the wing tip turbine generator 11 there may also be provided solar panels 14 and/or fuel cells 12 in the wing 7 or on other parts of the structure 6 to provide further sources of electrical power for the propulsive assemblies of the present invention.

The propulsive assemblies 9 of the present invention each present a propulsive air flow from their outlet in order to provide thrust. The specific location of the assemblies 9 will depend upon operational requirements for particular aircraft configurations. However, generally as depicted in FIG. 2 the assemblies 9 will be arranged in rows extending away from the main body structure of the aircraft. In such an arrangement, propulsive flows from each of the assemblies 9 will cascade over the wing for propulsion and lift.

FIG. 3 is a schematic side cross-section of an aircraft wing 30 incorporating three propulsive assemblies 31, 32, 33 in accordance with the present invention. The direction of airflow is shown by the arrowheads. The wing 30 is appropriately shaped for accepted aircraft operation to provide lift as a result of air flows over the wing 30. Thus, a leading edge 34 cuts into the air driving the airflows either over or under the wing 30 to create lift. The propulsive assemblies 31, 32, 33 facilitate such airflows for propulsion. The propulsive assemblies are also arranged to control the boundary layer and prevent separation.

Generally, as described previously each propulsive assembly 31, 32, 33 comprises a flow path in the form of a passage from an inlet to an outlet with a compressor appropriately located within that passage. The compressor is driven by an electric motor in order to generate the desired propulsive air flow. In accordance with the present invention each individual propulsive assembly 31, 32, 33 has relatively low propulsive thrust but there are normally several hundred such assemblies so that their collective effort and effect is sufficient to propel an aircraft particularly in flight without ground friction.

The propulsive assembly 31 is arranged with its passage 37 extending through the wing 30 from an upper surface 35 to a lower surface 36. Normally, the passage 37 is cylindrical and constrictive/funnel-like at the inlet end 38 to present airflow to a compressor 39. This compressor 39, as with the other compressors described with regard to assemblies 32, 33, can be a single stage or multi-stage or contra-rotating axial or centrifugal compressor to expel airflow with sufficient force to provide propulsion. After the compressor 39, at the outlet end 40, the flow path passage 37 is generally of uniform cross-section or possibly further constrictive to cause propulsion air flow jetting. However, in association with the angle of the passage 37, particularly after the compressor, care must be taken that the jet entrainment does not cause substantial projection of the propulsion flow from the surface of the wing 30 with possible resultant turbulence. In short, the propulsive airflow should have its major component in the lateral direction rather than vertically even though such vertical components of the airflow may add to lift. The propulsive assembly 31 increases the lift of the wing 30 and reduces the drag, relative to a wing with flaps, by sucking off the boundary layer from the upper surface 35 of the wing 30. The propulsive assembly, or propulsive assemblies 31 are used during take off and/or landing and may enable the use of flaps to be reduced or dispensed with.

The propulsive assembly 32 includes a passage 41 which is sunken within the upper surface 35 of the wing 30. Thus, an airflow passes over that upper surface 35 to enter the passage 41 through an inlet end 42 whereupon a compressor 43 propels that flow in order to generate propulsion out of an outlet end 44 to the passage 41. Thus, in accordance with known principles further lift is generated by the wing with its boundary layer drawn off the wing 30. Typically, the passage 41 prior to the compressor 43 is of uniform cross-section but either of the same cross-section or slightly constrictive in the outlet end 44 after that compressor 43 for propulsive airflow control and definition. The propulsive assembly 32 reduces the drag at increased angles of incidence and prevents boundary layer separation from the upper surface 35 of the wing 30. The propulsive assembly, or propulsive assemblies 32 may be used during take off and/or landing and/or may be used during cruise.

The propulsive assembly 33 again includes a passage 45 as an airflow path within which a compressor 47 operates to compress and propel air flow for propulsion and lift. The assembly 33 is located at the trailing edge of the wing 30. The compressor 47 is located further forward in the assembly 33 in comparison with earlier described assemblies 31, 32. Thus, the passage 45 after the compressor 47 is relatively long in the outlet end 48 to provide greater entrainment of the propulsive airflow generated by the compressor 47. Such greater entrainment will achieve improved propulsion efficiency ensuring a more robust lateral component to the flow for propulsion rather than lift. The propulsive assembly, or propulsive assemblies 33 provides the main propulsion and is/are used during take off, landing and cruise.

As indicated above the turbine compressors 39, 43, 47 are driven by respective electric motors which in turn are powered by an electricity source in the form of the gas turbine engine 8 and possibly supplemental sources e.g. wing tip vortex turbine generators 11 (FIG. 1), solar cells, fuel cells etc. In such circumstances, in operation the gas turbine engine 8 will be operated to generate electricity which is then drawn off to drive the motors of each propulsive assembly. The electrical load will vary during operation but it will be appreciated that electrical storage capacity in the form of batteries will add significantly to aircraft weight. In such circumstance the generator will be specified for expected maximum electrical load from the propulsive assemblies and that generator operated at reduced capacity at other times. Alternatively, the generator may be operated at its optimum efficiency and any excess electrical power dissipated by heat radiation as required but still leaving the electrical power from the generator available for rapid increase in requirements.

It will be understood that in order to provide braking it is common for propulsive arrangements to present reverse thrust, that is to say in the opposite direction to normal motion. The present propulsive assemblies can provide such reverse thrust simply by reversing the motor and therefore compressor direction. Furthermore, a first set of propulsive assemblies may be switched off whilst others continue with propulsion then those others switched off whilst the first set can then present reverse thrust immediately.

During operation of an aircraft there are periods of different propulsive requirements, for example the requirements at take-off, taxi and at cruise are significantly different. In order to achieve greater efficiency the present invention allows the number of propulsive assemblies operation to be varied and the individual propulsive flow from each assembly to be varied for best performance. Thus, each individual propulsive assembly or specific groups of such assemblies may be addressed to either switch them on or off or vary the electrical power supplied to the electric motor and so propulsive force provided by that assembly or group of assemblies. Normally, it will be appreciated there are hundreds of propulsive assemblies within an arrangement in accordance with the present invention so that generally there will be a controller to translate performance requirements defined by a pilot for the aircraft into the best combination of propulsive assemblies to achieve that performance requirement for most efficient propulsive arrangement operation. This combination may also be dependent upon other factors sensed by appropriate sensors including assembly failure.

For example during take off all the propulsive assemblies 31, all the propulsive assemblies 32 and all the propulsive assemblies 33 are switched on for maximum propulsion. During cruise some, or all, of the propulsive assemblies 31 are switched off and some of the propulsive assemblies 32 are switched off and all the propulsive assemblies 33 are switched on. The numbers of propulsive assemblies 31 and propulsive assemblies 32 switched on is determined by the propulsion required.

It will be understood that the propulsive assemblies in accordance with the present invention will normally have inlet and outlet flaps associated with them in order to close the assemblies. Thus, the flaps are placed across the inlet end and/or outlet end to reduce aerodynamic drag which would be caused by the assemblies remaining open when not in use. These flaps are operated to close when the respective propulsive assembly is not required and opened when that propulsive assembly is required. The flaps may be hinged on one side or more normally will slide across the inlet or outlet.

Typically, the inlets will be round with a diameter in the order of 150 mm but different sizes may be used dependent upon operational requirements. Similarly, the passages for each flow path of the propulsive assemblies are also angled and have a length determined by operational requirements.

The present invention provides the benefits of:

a) Reducing fan blade off and bird strike problems and parasitic weight.
b) Eliminating contradiction between high bypass ratio for noise and high propulsive efficiency but corresponding increase in weight and drag.
c) Increased propulsive efficiency through energizing of wing boundary layer and elimination of nacelle drag from an engine pod.
d) Eliminating fan noise.
e) Up to a 50% reduction in weight.
f) Significant cost reductions.
g) Up to a 20% increase in energy recycling.
h) Increased damage tolerance.

As indicated above the use of a relatively large number of propulsive assemblies allows a reduction in wing size due to the increased efficiency of boundary layer lift and weight saving.

A compressor 39, as shown in FIG. 4, comprises a compressor, or fan, 50 rotatably mounted in a casing 52. The compressor 50 comprises a rotor 54 and a plurality of circumferentially arranged radially outwardly extending rotor blades 56 arranged coaxially within the casing 52. The casing 52 is connected to a hub 58 by a plurality of circumferentially arranged radially extending stator vanes 60 which extend between and are secured to the casing 52 and the hub 58. An electric motor 62 is secured coaxially in the hub 58 and the electric motor 62 is arranged to drive the rotor 54 via a shaft 64. An electrical lead 66 is connected at a first end to electric motor 62 and the electrical lead 66 extends through the hub 58, one of the stator vanes 60 and the casing 52. A second end of the electrical lead 66 has a connector 68 to enable connection to the electricity source. The compressor 39A is a single stage axial flow compressor.

Figure 5:
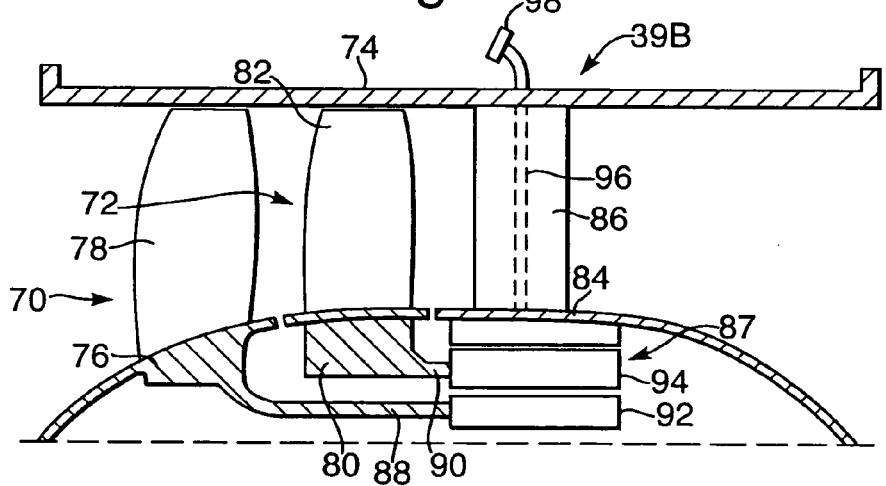
FIG. 5 is a part longitudinal cross-sectional view through an alternative compressor of a propulsive assembly according to the present invention.

An alternative compressor 39B, as shown in FIG. 5, comprises a first compressor, or fan, 70 and a second compressor, or fan, 72 both of which are rotatably mounted in a casing 74. The first compressor 70 comprises a first rotor 76 and a plurality of circumferentially arranged radially outwardly extending rotor blades 78 arranged coaxially within the casing 74. The second compressor 72 comprises a second rotor 80 and a plurality of circumferentially arranged radially outwardly extending rotor blades 82 arranged coaxially within the casing 74. The second compressor 72 is arranged axially downstream of the first compressor 70. The casing 74 is connected to a hub 84 by a plurality of circumferentially arranged radially extending stator vanes 86 which extend between and are secured to the casing 74 and the hub 84. An electric motor 86 is secured coaxially in the hub 84 and the electric motor 86 is arranged to drive the first rotor 76 via a first shaft 88 and to drive the second rotor 80 via a second shaft 90. The electric motor 86 is of the type which comprises a rotor 92 and a rotating stator 94, wherein the rotating stator 94 rotates in the opposite direction to the rotor 92 and thus the first compressor 70 and the second compressor 72 are contra-rotating. An electrical lead 96 is connected at a first end to the electric motor 86 and the electrical lead 96 extends through the hub 84, one of the stator vanes 86 and the casing 74. A second end of the electrical lead 96 has a connector 98 to enable connection to the electricity source. The compressor 39B is a multi-stage contra-rotating axial flow compressor.

Figure 6:
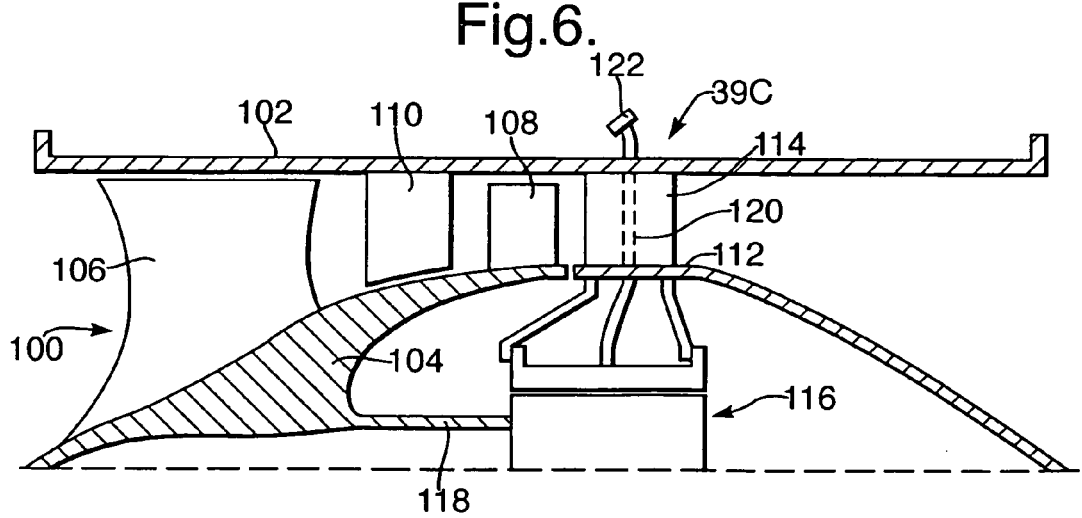
FIG. 6 is a part longitudinal cross-sectional view though a further compressor of a propulsive assembly according to the present invention.

A further compressor 39C, as shown in FIG. 6, comprises a compressor 100 rotatably mounted within a casing 102. The compressor 100 comprises a rotor 104, a plurality of circumferentially arranged radially outwardly extending first rotor blades 106 and a plurality of circumferentially arranged radially outwardly extending second rotor blades 108 arranged coaxially within the casing 102. The casing 102 carries a plurality of circumferentially arranged radially inwardly extending first stator vanes 110, which are arranged axially between the first rotor blades 106 and the second rotor blades 108. The second rotor blades 108 are arranged axially downstream of the first rotor blades 106. The casing 102 is connected to a hub 112 by a plurality of circumferentially arranged radially extending second stator vanes 114 which extend between and are secured to the casing 102 and the hub 112. An electric motor 116 is secured coaxially in the hub 112 and the electric motor 116 is arranged to drive the rotor 104 via a shaft 118. An electrical lead 120 is connected at a first end to the electric motor 116 and the electrical lead 120 extends through the hub 112, one of the second stator vanes 114 and the casing 102. A second end of the electrical lead 120 has a connector 122 to enable connection to the electricity source. The compressor 39C is a multi-stage centrifugal-axial flow compressor.

As shown in FIGS. 4 to 6 the compressor 39, 39B or 39C of propulsive assembly 9 is an integral unit comprising at least one compressor, a motor, a hub and a casing. These compressors 39, 39B, or 39C, are integral units, are easily installed and/or removed from the structure of the aircraft by securing the casing to the structure of the aircraft within an appropriate passage in the aircraft structure. For example the casings may have flanges which are bolted or fastened, to the appropriate passage. The compressors 39, 39B or 39C have electrical leads which have connectors to enable electrical connection to the source of electricity. Alternatively the casings may be latched into the appropriate passage or suitable device used.

As an alternative, it may be possible for the compressor of the propulsive assembly 9 to be an integral unit comprising at least one compressor, a motor and a hub. In this instance the integral unit may have stator vanes integral with the hub, and the radially outer ends of the stator vanes are fastened to the appropriate passage. Alternatively the integral unit may not have stator vanes secured to the hub and the hub is fastened to the radially inner ends of the stator vanes which are integral with the appropriate passage.

The compressor typically has a diameter of 150 mm as mentioned previously, the diameter of the compressor is approximately 280 mm if there are 100 propulsive assemblies, the diameter of the compressor may be 200 mm if there are 200 propulsive assemblies. The diameter of the compressor is preferably up to 300 mm, preferably 150 mm to 280 mm, preferably 150 mm to 200 mm. The upper limit for the diameter of the compressor is determined by the weight, which must be light enough to enable the compressor to be installed and removed by hand. It may be appropriate for all the compressors to have the same dimensions and thrust capability on an aircraft. Alternatively, it may be appropriate for some of the compressors to have different dimensions and thrust capability on an aircraft. Thus there may be a range of compressors with different dimensions and thrusts.

It will also be understood that by judicial use of the propulsive assemblies the aileron flaps may be eliminated as the assemblies will allow an increase in lift when required. Furthermore, as indicated above, the use of assemblies in accordance with the present invention will allow use of a smaller undercarriage as less clearance is needed for a large propulsive aero engine.

Although described with reference to aircraft wings it will be understood that propulsive assemblies can be mounted within other structures such as the main body and the tail fins. Furthermore, although described with regard to one side of an aircraft it will be understood that the present propulsive arrangement will be used on both sides.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An aircraft propulsion arrangement comprising a plurality of propulsive assemblies substantially located within and about the structure of an aircraft, the propulsive assemblies being electrically driven and configured to generate air flows which are drawn from above an aircraft wing from its boundary layer with principally lateral air flow for propulsion of the aircraft, each propulsive assembly comprising a flow path and a compressor driven by an electric motor, the propulsive assemblies being located in an aircraft wing having two surfaces, a leading and a trailing edge with one surface facing in one direction and the other surface facing generally in the opposite direction to said one direction, each flow path comprising a passage, the passage provides an inlet and an outlet with the compressor between them, an inlet of a passage of at least one propulsive assembly being provided in said one surface of the wing and an outlet of a passage of the at least one propulsive assembly being provided in said one surface of the wing; an inlet of a passage of at least one other propulsive assembly being provided in said one surface of the wing and an outlet of a passage of the at least one other propulsive assembly being provided in said other surface of the wing and an inlet of a passage of at least one further propulsive assembly being provided in said one surface of the wing and an outlet of a passage of at least one propulsive assembly being provided in said trailing edge of the wing.

2. An arrangement as claimed in claim 1 wherein each compressor provides propulsive air flow.

3. An arrangement as claimed in claim 1 wherein said inlets have a width of 150 mm.

4. An arrangement as claimed in claim 1 wherein the propulsive arrangement comprises two hundred propulsive assemblies, one hundred propulsive assemblies arranged in each wing.

5. An arrangement as claimed in claim 1 wherein each propulsive assembly is selectively operable to vary their propulsive airflow rate and to allow each propulsive assembly to be switched off or on as required.

6. An arrangement as claimed in claim 1 wherein the propulsive assemblies are operationally reversible to provide reverse thrust.

7. An arrangement as claimed in claim 1 wherein the propulsive assemblies have an electricity supply provided by a gas turbine engine with an electricity generator.

8. An arrangement as claimed in claim 1 wherein the propulsive assemblies have an electricity supply comprising fuel cells.

9. An arrangement as claimed in claim 1 wherein each propulsive assembly includes a flap in order to close off the propulsive assembly when not in use for aerodynamic profile drag characteristic improvement.

10. An arrangement as claimed in claim 1 wherein each propulsive assembly or at least the compressor is an integral unit readily installed and removed from the structure for maintenance and repair.

11. An arrangement as claimed in claim 1 wherein at least the compressor in each propulsive assembly is inter-changeable with the compressor in other propulsive assemblies within the arrangement.

12. An arrangement as claimed in claim 1 comprising a first group of propulsive assemblies, a second group of propulsive assemblies and a third group of propulsive assemblies, the first group of propulsive assemblies comprising a plurality of first propulsive assemblies each having an inlet and an outlet, the inlet of the passage of each first propulsive assembly being provided in an upper surface of the wing and the outlet of the passage of each first propulsive assembly is provided in a lower surface of the wing, the second group of propulsive assemblies comprising a plurality of second propulsive assemblies each having an inlet and an outlet, the inlet of the passage of each second propulsive assembly being provided in an upper surface of the wing and the outlet of the passage of each second propulsive assembly being provided in an upper surface of the wing, the third group of propulsive assemblies comprising a plurality of third propulsive assemblies each having an inlet and an outlet, the inlet of the passage of each third propulsive assembly being provided in an upper surface of the wing and the outlet of the passage of each third propulsive assembly being provided in a trailing edge of the wing.

13. An arrangement as claimed in claim 12 wherein the first group of propulsive assemblies, the second group of propulsive assemblies and the third group of propulsive assemblies are selectively operable to vary their propulsive airflow rate on as required.

14. An arrangement as claimed in claim 12 wherein each group of propulsive assemblies is selectively operable to vary their propulsive airflow rate and to allow each group of propulsive assemblies to be switched off or on as required.

15. An arrangement as claimed in claim 13 wherein all of the propulsive assemblies of the first group of propulsive assemblies, all of the propulsive assemblies of the second group of propulsive assemblies and all of the propulsive assemblies of the third group of propulsive assemblies are switched on during take off, at least some of said propulsive assemblies of the second group of propulsive assemblies are switched off during cruise and all of the propulsive assemblies of the third group of propulsive assemblies are switched on during cruise.

16. An arrangement as claimed in claim 12 wherein the said inlets have a diameter of 150 mm to 300 mm.

17. An arrangement as claimed in claim 12 wherein the compressor has a diameter of 150 mm to 200 mm.

18. An arrangement as claimed in claim 12 wherein there are one hundred propulsive assemblies and the compressors have a diameter of 280 mm.

19. An arrangement as claimed in claim 12 wherein there are two hundred propulsive assemblies and the compressors have a diameter of 200 mm.

20. An arrangement as claimed in claim 12 wherein the inlets of the passages of the first group of propulsive assemblies are arranged nearer to a leading edge of the wing than the inlets of the passages of the second group of propulsive assemblies and the inlets of the passages of the second group of propulsive assemblies are arranged nearer to the leading edge of the wing than the inlets of the passages of the third group of propulsive assemblies.

21. An arrangement as claimed in claim 1 wherein the propulsive assemblies are located through a wing cross-section.

22. An arrangement as claimed in claim 1 wherein the propulsive assemblies form the tail of said wing.

23. An arrangement as claimed in claim 1 wherein each compressor is a multi-stage compressor to provide propulsive air flow.

24. An arrangement as claimed in claim 1 wherein each compressor is a contra-rotating axial flow compressor to provide propulsive airflow.

25. An arrangement as claimed in claim 1 wherein each compressor is a centrifugal flow compressor to provide propulsive air flow.

26. An arrangement as claimed in claim 1 wherein the propulsive assemblies have an electricity supply comprising solar cells.

27. An arrangement as claimed in claim 1 wherein the propulsive assemblies have an electricity supply comprising wind turbines.

* * * * *